United States Patent [19]

Yamanishi et al.

[11] Patent Number: 4,704,639
[45] Date of Patent: Nov. 3, 1987

[54] VIDEO SIGNAL REPRODUCTION APPARATUS

[75] Inventors: Kazuhiro Yamanishi, Higashiosaka; Masaaki Kobayashi, Kawanishi; Masafumi Shimotashiro, Neyagawa, all of Japan

[73] Assignee: Matsushita Electric Industrial Co., Ltd., Kadoma, Japan

[21] Appl. No.: 842,802

[22] Filed: Mar. 21, 1986

[30] Foreign Application Priority Data

| Mar. 26, 1985 | [JP] | Japan | 60-61109 |
| Apr. 25, 1985 | [JP] | Japan | 60-89207 |
| May 21, 1985 | [JP] | Japan | 60-108804 |
| May 21, 1985 | [JP] | Japan | 60-108805 |
| May 21, 1985 | [JP] | Japan | 60-108827 |

[51] Int. Cl.$^4$ .............................................. H04N 9/83
[52] U.S. Cl. ...................................... 358/330; 358/320
[58] Field of Search ............... 358/310, 320, 324, 326, 358/327

[56] References Cited

U.S. PATENT DOCUMENTS

| 4,100,567 | 7/1978 | Yoshinaka | 358/324 |
| 4,326,216 | 4/1982 | Jensen | 358/326 |
| 4,490,749 | 12/1984 | Hirota | 358/320 |
| 4,490,750 | 12/1984 | Yoshinaka | 358/320 |
| 4,590,510 | 5/1986 | Jensen et al. | 358/326 |

Primary Examiner—Donald McElheny, Jr.
Attorney, Agent, or Firm—Wenderoth, Lind & Ponack

[57] ABSTRACT

A video signal reproduction apparatus for reproducing a composite color video signal from a recording medium. A signal reproduced from the recording medium is divided into a frequency-modulated (FM) signal and a low-band-converted signal by filters. The FM signal is demodulated by a demodulater into a luminance signal. A first conversion circuit produces from the low-band-converted signal a chrominance signal without a phase jitter component. A second conversion circuit produces from the low-band-converted signal a high-band component of luminance signal with a same phase jitter component as that of the luminance signal obtained from the demodulator. The luminance signal from the demodulator, the high-band component of luminance signal and the chrominance signal are mixed to obtain the composite color video signal.

16 Claims, 13 Drawing Figures

VIDEO SIGNAL REPRODUCTION APPARATUS

BACKGROUND OF THE INVENTION

1. Field of the Invention

The present invention relates to an apparatus for reproducing video signals recorded on a recording medium using low-band frequency conversion system.

2. Description of Prior Art

Recently, reflecting significant improvement of video cassette recorders (VCRs), extremely high-quality picture producing performance is keenly desired.

Conventional apparatuses for recording and reproducing low-band-converted video signals will be described below.

First, the recording apparatus will be described. Conventionally, when recording a composite color video signal of either NTSC or PAL system, only the low-band luminance signal component $Y_L$ of luminance signal Y is taken out by a 3 MHz low-pass filter, and converted into a frequency-modulated signal by a FM modulator. On the other hand, the composite color video signal which has passed through a band-pass filter (BPF) passing color subcarrier signal eventually becomes a mixed signal of high-band component $Y_H$ of luminance signal Y and chrominance signal C. Since the chrominance signal C is composed of subcarrier fs and side-band component fc, the mixed signal can be represented as "fs+fc+$Y_H$". Only the color burst signal is then extracted from the mixed signal, and converted into a continuous signal having the color-burst frequency, i.e., color subcarrier frequency fs, by a phase-locked loop (PLL) comprised of a phase-comparator, a low-pass filter (LPF), and a voltage-controlled oscillator (VCO). Horizontal synchronizing signal $f_H$ extracted from the composite color video signal by means of sync-separator is converted by another PLL comprised of a phase comparator, a LPF, a VCO, and a frequency divider into a low-band subcarrier $f_1$. A signal generated by balanced modulation with the color subcarrier fs via a balanced modulator (BM) becomes a continuous signal expressed as "fs+$f_1$". By feeding this continuous signal and the mixed signal from the BPF into another BM, a low-band-converted signal "$f_1$−fc−$Y_H$" is generated.

$$(fs+f_1)-(fs+fc+Y_H)=f_1-fc-Y_H$$

This signal and the frequency-modulated luminance signal are synthesized, amplified by a recording amplifier, and recorded by a recording head onto a magnetic tape.

Next, the conventional reproducing apparatus will be described. A signal reproduced by a reproducing head is amplified by a pre-amplifier and then split into the frequency-modulated (FM) luminance signal and the low-band-converted signal by a high-pass filter (HPF) and a LPF. A limiter limits the amplitude of the FM luminance signal to stabilize the amplitude, and then a demodulator demodulates the FM luminance signal into the original low-band luminance signal $Y_L$. This signal $Y_L$ contains a certain amount of jitter component Δ generated by the tape-driving mechanism.

On the other hand, the low-band-converted signal passed through the LPF is reconverted to the chrominance signal C having the color subcarrier fs by means of a signal from a local oscillator and a chrominance signal processor. The chrominance signal C is mixed with the low-band luminance signal $Y_L$ to be the original composite color video signal. At this time, the chrominance signal processor operates to stabilize the phase of the color burst signal so that designated colors can be correctly reproduced on the television screen. In other words, in the chrominance signal processor, only the color burst signal is extracted from the signal which is frequency-modulated by a BM and passed through a BPF, and the color burst signal is phase-compared with a signal from a color subcarrier frequency oscillator by a phase comparator. The signal containing a phase difference of the compared phases is then smoothened by a LPF and drives a VCO. The VCO outputs a frequency $f_1+\Delta$ which is a mixture of the low-band subcarrier frequency $f_1$ and the phase-difference signal component Δ. This output of the VCO is frequency-modulated by the output of the color subcarrier frequency oscillator at a BM to be fs+$f_1$+Δ, and frequency-converted by the low-band-converted signal $f_1$−fc−$Y_H$+Δ at a BM to be a color carrier signal fs+fc+$Y_H$ as shown below.

$$(fs+f_1+\Delta)-(f_1-fc-Y_H+\Delta)=fs+fc+Y_H$$

This loop, as represented by the above equation, performs a negative feed-back operation to offset all the phase differences, thus generating signals that are free from phase jitter component. Conventionally, this is called automatic phase control (APC). The details of the above are disclosed by Japanese Patent Publication No. 50-14852. Since the phase jitter component is completely eliminated from color carrier signal, colors are correctly reproduced. Although the frequency-demodulated low-band luminance signal $Y_L+\Delta$ still contains the jitter component, the television set can properly follow up compensation for the jitter component so that picture can be reproduced normally.

However, after converting frequencies of the low-band-converted signal, the jitter component is totally eliminated from the high-band luminance signal $Y_H$ contained in the signals in the color subcarrier frequency band while the television set follows up compensation for the jitter component A of the low-band luminance signal $Y_L+\Delta$, so that the high-band luminance signal $Y_H$ visually swings itself, thus lowering the actual quality of the reproduced high-band luminance signal $Y_H$. Methods for effectively using the high-band luminance signal $Y_H$ is already disclosed by Japanese Laid-Open Patent Applications No. 57-89387 and No. 57-89388. But, these methods require a time base corrector which cannot easily be configured. In addition, according to those prior arts, it is necessary to provide the carrier-frequency for frequency-conversion to be an integer-multiple of the synchronizing signal. Nevertheless, when the subcarrier-frequency fs of the NTSC video signal is used, the frequency cannot match the integer-multiple of the synchronizing signal, so that the proposed prior art cannot be applied practically.

SUMMARY OF THE INVENTION

In the light of those disadvantages inherent to prior arts described above, an object of the present invention is to provide a novel video signal reproduction apparatus capable of securely realizing a high resolution with a simplified constitution without requiring installation of the complicated time base corrector.

To achieve this object, a video signal reproduction apparatus according to the present invention is provided with two systems for converting a low-band-converted signal into an original signal. One system, which is directed to process chrominance signal, eliminates phase jitter component from the color subcarrier frequency, and thereafter extracts only the chrominance signal by means of a comb filter (CF). The other system, which is directed to process luminance signal, converts the frequency of the luminance signal without eliminating the jitter component, and thereafter extracts only the luminance signal by means of a comb filter (CF). The chrominance and luminance signals from the two systems are mixed with a demodulated low-band luminance signal to obtain a composite video signal in which the chrominance signal contains no phase jitter components and the high-band component of the luminance signal contains a same amount of jitter component as that contained in the low-band component of the luminance signal (thus the high-band luminance signal is perfectly synchronized with the low-band luminance signal). Consequently, the high-band luminance signal visually appears as if it constantly remains still on the television screen. This provides a TV picture with an extremely high resolution and correct colors.

According to the present invention, it is possible to effectively reproduce the high-band component of the low-band-converted luminance signal in an extremely simple constitution without requiring complicated devices such as the time base corrector.

BRIEF DESCRIPTION OF THE DRAWINGS

FIGS. 8 through 9(h) are respectively waveform charts showing waveforms in the circuit shown in FIG. 7;

FIGS. 12 through 13(g) are respectively waveform charts showing waveforms in the circuit shown in FIG. 11.

DESCRIPTION OF THE PREFERRED EMBODIMENTS

Referring now to the accompanying drawings, the preferred embodiments of the present invention will be described below.

Figure 1:
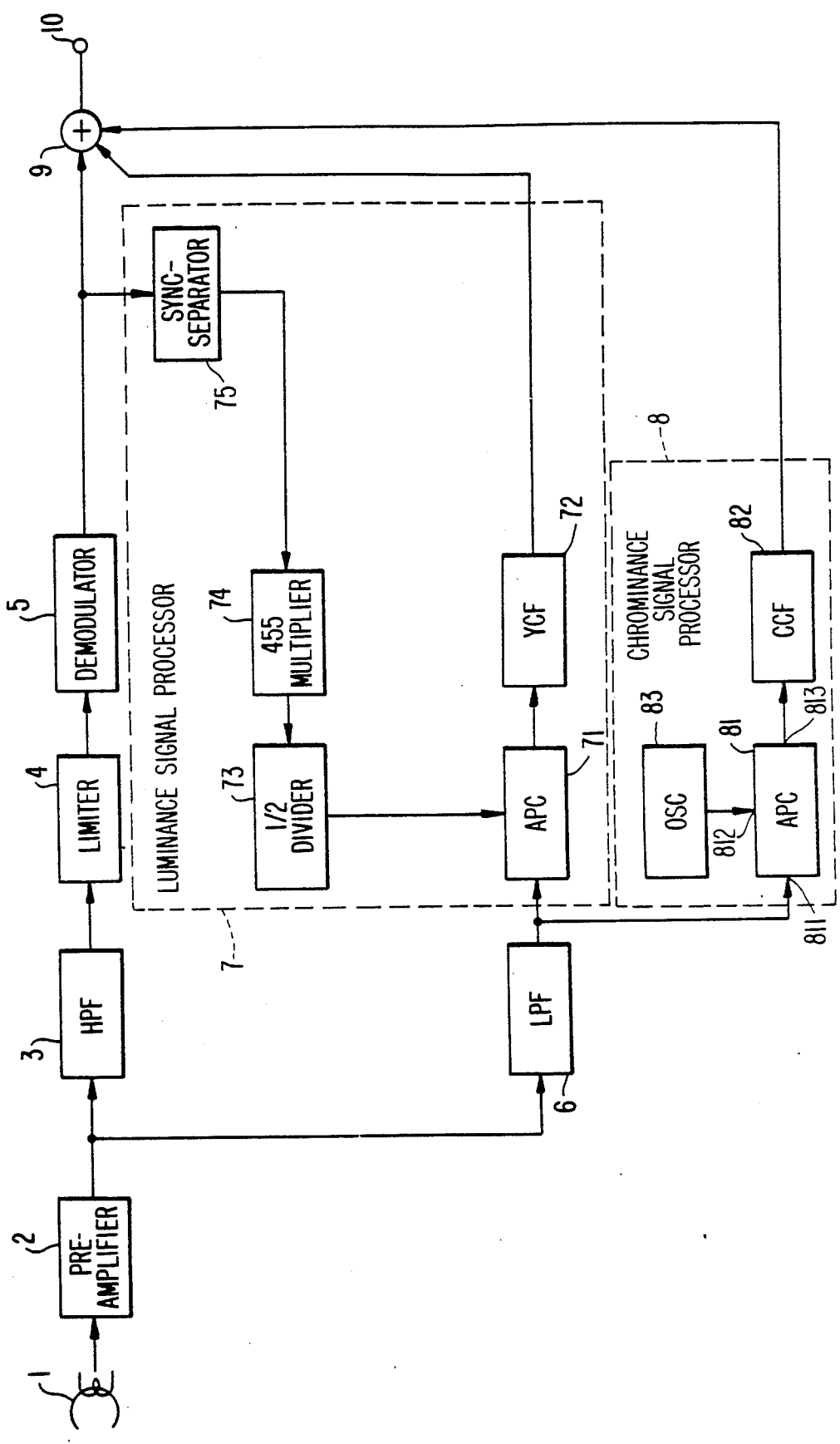
FIG. 1 is a block diagram showing a video signal reproduction apparatus as a preferred embodiment of the present invention.

FIG. 1 is a block diagram showing a video signal reproduction apparatus as a preferred embodiment of the present invention. A video signal reproduced by a reproduction head 1 is amplified by a pre-amplifier 2 and then split into a frequency-modulated luminance signal and a low-band-converted chrominance signal by a high-pass filter (HPF) 3 and a low-pass filter (LPF) 6, respectively. Like any conventional practice, a limiter 4 eliminates amplitude variation of the frequency-modulated luminance signal, and then a demodulator 5 demodulates the frequency-modulated luminance signal to obtain a reproduced luminance signal. The low-band-converted chrominance signal is delivered to two frequency-conversion processors—a conventional chrominance signal processor 8 and a luminance signal processor 7 featuring the preferred embodiment of the present invention.

An oscillated signal from a local oscillator (OSC) 83 in the chrominance signal processor 8 is delivered to an automatic phase controller (APC) 81 which stabilizes the color burst. From the output signal of the APC 81, a chrominance comb filter (CCF) 82 extracts only the chrominance signal.

The APC 81 and the OSC 83 in the chrominance signal processor 8 are respectively provided with constitutions identical to those which are shown in Japanese Patent Publication No. 50-14852, and therefore, detailed description of these is omitted here. In summary, the frequency of the low-band-converted chrominance signal delivered to an input terminal 811 of the APC 81 is converted into a specific frequency from a reference input terminal 812, and the phase of the color burst at an output terminal 813 is correctly locked by a negative feedback loop to the phase of the signal from the reference input terminal 812 so that the color burst is stabilized.

Next, the luminance signal processor 7 featuring the preferred embodiment of the present invention will be described below.

The low-band-converted chrominance signal is delivered to an automatic phase controller (APC) 71 so that the frequency is converted. The automatic phase controller 71 has the constitution which is exactly identical to that of the automatic phase controller 81. The luminance signal processor 7 has a substantial difference in its function from that of the chrominance signal processor 8. Specifically, the frequency of a reference input signal fed to the automatic phase controller 71 is not stationary, but varies in synchronous with a jitter component of the reproduced luminance signal. In other words, the color burst signal from the automatic phase controller 71 is synchronized with the jitter component of the reproduced luminance signal.

To generate the reference input signal synchronized with the jitter component of the reproduced luminance signal, in the luminance signal processor 7, a sync-separator 75 extracts the horizontal synchronizing signal from the output signal of the demodulator 5; a 455 multiplier 74 multiplies the frequency of the horizontal synchronizing signal by 455; and a ½ frequency divider divides the multiplied frequency into one-half thereby to eventually produce a color subcarrier signal as the reference input signal. This is based on the fact that, in the NTSC system, a specific relationship is established between the color subcarrier frequency fs and the frequency $f_H$ of the horizontal synchronizing signal, which is expressed by the equation shown below.

$$fs = (455/2)f_H \text{ (NTSC system)}$$

Next, the operation of the luminance signal processor 7 will be described in detail. The VCO in the APC 71 oscillates at the frequency $f_1$. However, like the conventional chrominance signal processor 8, due to the phase difference, the oscillated frequency becomes $f_1 + \Delta$.

Since the reference input signal is $f_s+\Delta$, the BM generates a signal expressed by $f_s+f_1+2\Delta$. This signal is further subjected to balanced modulation with the low-band-converted chrominance signal, so that a reproduced chrominance signal $f_s+f_c+Y_H+\Delta$ can eventually be generated in accordance with the formula shown below.

$$(f_s+f_1+2\Delta)-(f_1-f_c-Y_H+\Delta)=f_s+f_c+Y_H+\Delta$$

The resultant signal $f_s+f_c+Y_H+\Delta$ contains the jitter component $\Delta$ which is not present in the output signal of the chrominance signal processor 8.

The reproduced chrominance signal contains the frequency-interleaved high-band component $Y_H$ of the luminance signal. A signal $Y_H+\Delta$ is generated by passing the reproduced chrominance signal through a luminance comb filter (YCF) 72. This signal bears the same jitter as that of the reproduced luminance signal $Y_L$.

Figure 2:
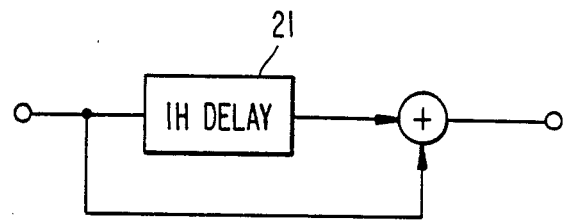
FIG. 2 is a block diagram of a luminance signal processing comb filter.
Figure 3:
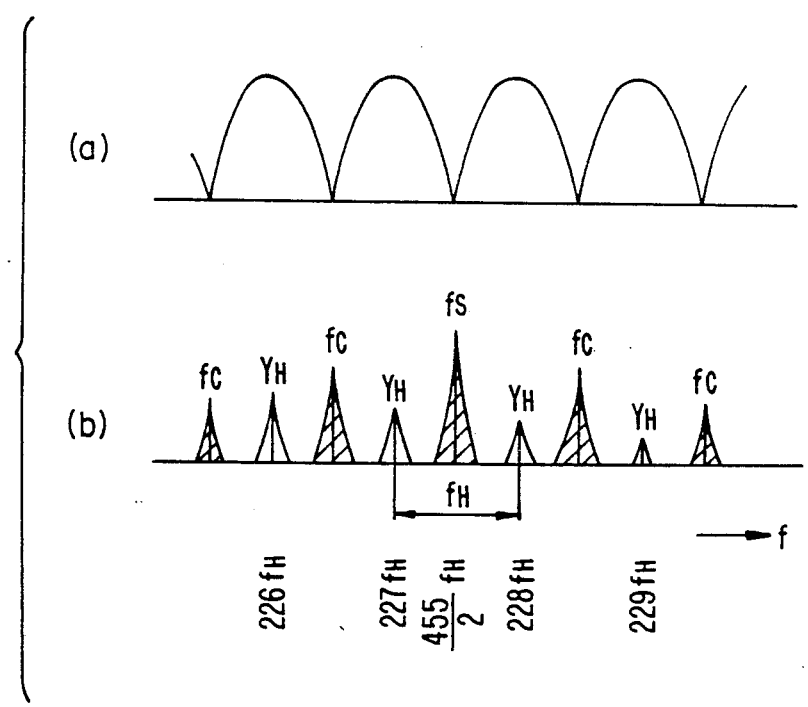
FIG. 3 is a chart showing a relationship between a frequency characteristic of the comb filter (a) and a frequency interleave (b)

As well known, the chrominance signal and the luminance signal are in the frequency-interleaved relationship as shown in FIG. 3 (b). Since the luminance comb filter 72, as shown in FIG. 2, that outputs the sum of both the output and input signals of a 1-horizontal period (1H) delay element has the specific frequency characteristic as shown in FIG. 3 (a), the luminance comb filter 72 can attenuate only the chrominance signal.

By combining the chrominance signal, the high-band component $Y_H$ of the luminance signal, and the low-band luminance signal $Y_L$ from the demodulator 5 altogether at an adder 9, a composite video signal containing the chrominance signal free from the phase jitter and the luminance signal containing identical jitter components in both the high-band and low-band components can be obtained at an output terminal 10. When viewing this video signal through the television screen, since the chrominance signal is totally free from the phase jitter component, colors can be precisely and clearly reproduced. In addition, since the television set can correctly follow up compensation for the jitter component of the luminance signal, the high-band component of the luminance signal is seen stationary without causing swinging on the television screen.

In the above embodiment the horizontal synchronizing signal is applied to the luminance signal processor 7. However, it should be understood that a pilot signal recorded on a magnetic tape can also be employed to obtain the same effect as that realized by the horizontal synchronizing signal. For example, a pilot signal by multiplexing a sinewave signal of a specific frequency corresponding to 1/n (n: integer) of the color subcarrier frequency may be recorded on a magnetic tape.

Figure 4:
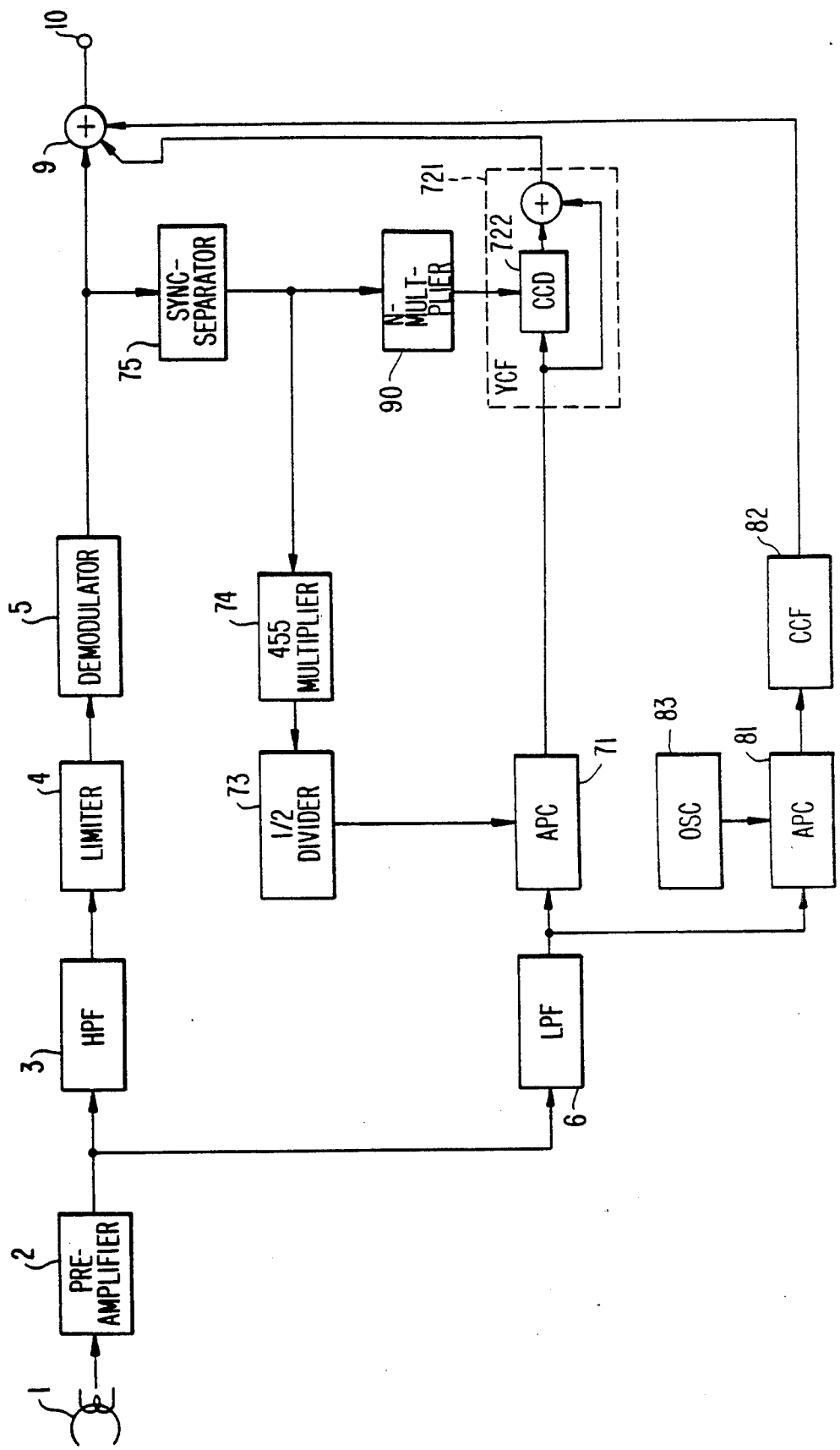
FIGS. 4 through 6 are respectively block diagrams showing video signal reproduction apparatuses as other preferred embodiments of the present invention.

FIG. 4 is a block diagram showing another preferred embodiment of the present invention. As described earlier, the luminance comb filter (YCF) 72 attenuates the chrominance signal in order to extract only the high-band component $Y_H$ of the luminance signal. However, since the signal from the automatic phase controller 71 contains a certain amount of jitter component, the spectrum shown in FIG. 3 (b), when finely observed, is horizontally swinging. As a result, when a significantly large amount of jitter is present, the luminance comb filter that uses the delay-line having a constant delay time cannot sufficiently attenuate the chrominance signal due to the too narrow width of the nodes of the frequency characteristic.

To compensate for this, the embodiment shown in FIG. 4 is provided with a luminance comb filter 721 that uses a variable delay line 722 whose delay time varies according to a clock pulse frequency instead of the luminance comb filter 72. The variable delay line 722 may be a charge-coupled device (CCD). Sync-separator 75 generates a synchronizing signal containing a jitter component. The clock pulse is generated by an N-multiplier 90 phase-locked to the jitter containing synchronizing signal. This causes the frequency characteristic shown in FIG. 3 (a) to swing in the horizontal direction in response to the signal in the color carrier signal band, and as a result, the chrominance signal can be attenuated effectively. In other words, the N-multiplier 90 generates a specific frequency which is N times the synchronizing signal frequency containing the jitter component. By feeding this frequency to the N-stage charged-coupled device 722, both the output and input of the charged-coupled device 722 are held in a specific correlation with each other so that the chrominance signal in the inverse-phase relationship can be attenuated eventually.

Note that, if frequencies of the N-multiplier 90 and the 455-multiplier 74 used for the automatic phase controller 71 are in a multiple relationship, one PLL oscillator can be commonly used. For example, when using a 455-stage charged-coupled device, the output of the 455-multiplier 74 can be used in place of the N-multiplier 90, thus making it possible to remove the N-multiplier 90.

Figure 5:
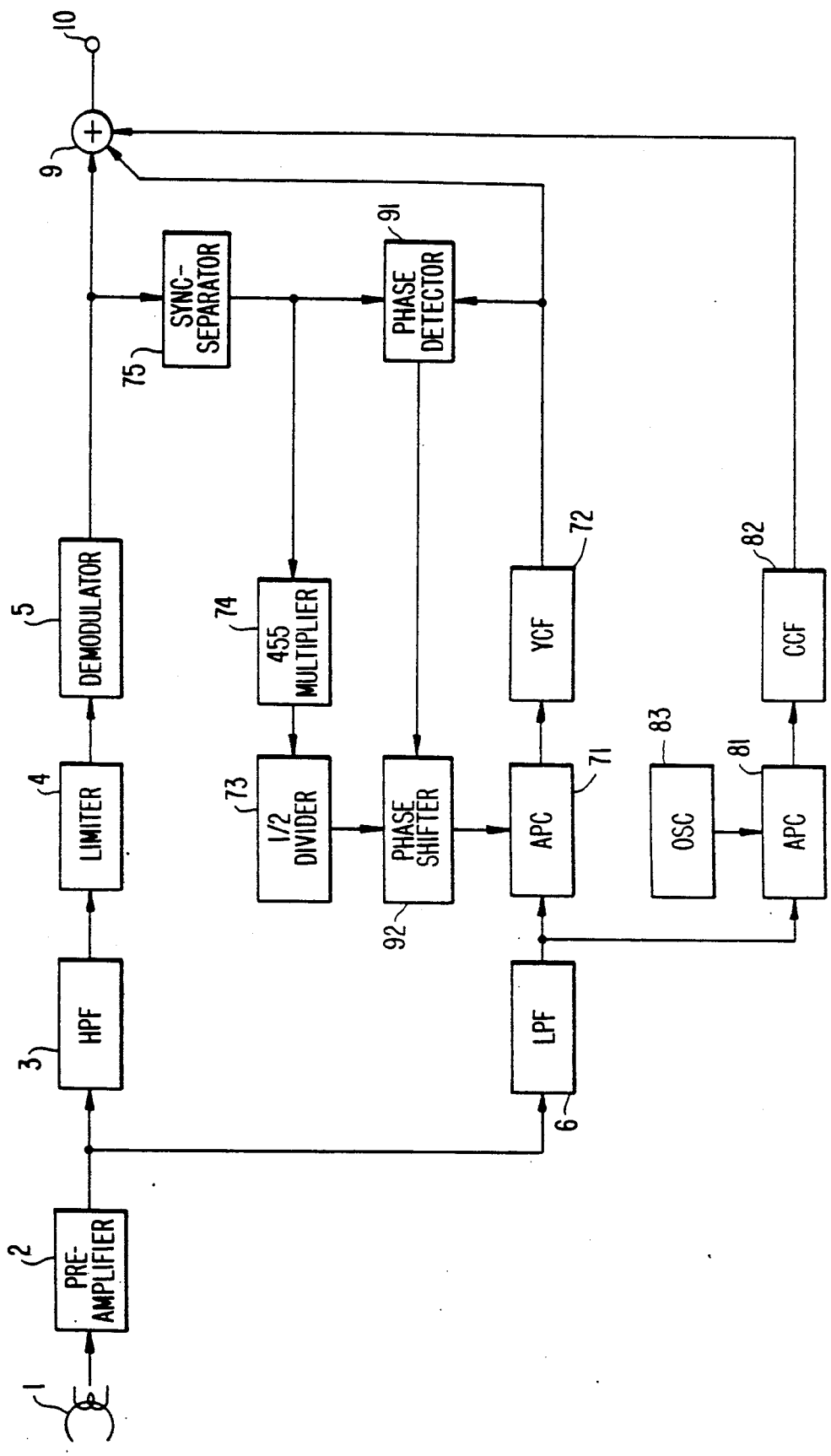

FIG. 5 is a block diagram showing a video signal reproduction apparatus as still another preferred embodiment of the present invention. In the preferred embodiment shown in FIG. 1, the high-band component $Y_H$ of the luminance signal visually appears to remain still, but no phase-relationship is defined between $Y_H$ and $Y_L$. The constitution of the preferred embodiment shown in FIG. 5 includes a phase control element in addition to the constitution shown in FIG. 1 so as to control the phase relationship between $Y_H$ and $Y_L$. A phase detector 91 detects the phase relationship between the synchronizing signal from the sync-separator 75 and the high-band component of the synchronizing signal in the high-band luminance signal $Y_H$, and controls a phase shifter 92 in order to hold the phase relationship constant. This allows the phase of the carrier to be held precisely so that the phases of the high-band luminance signal $Y_H$ and the low-band luminance signal $Y_L$ can correctly match each other. As a result, it is possible to more precisely reproduce the high-band component $Y_H$ of the luminance signal.

Figure 6:
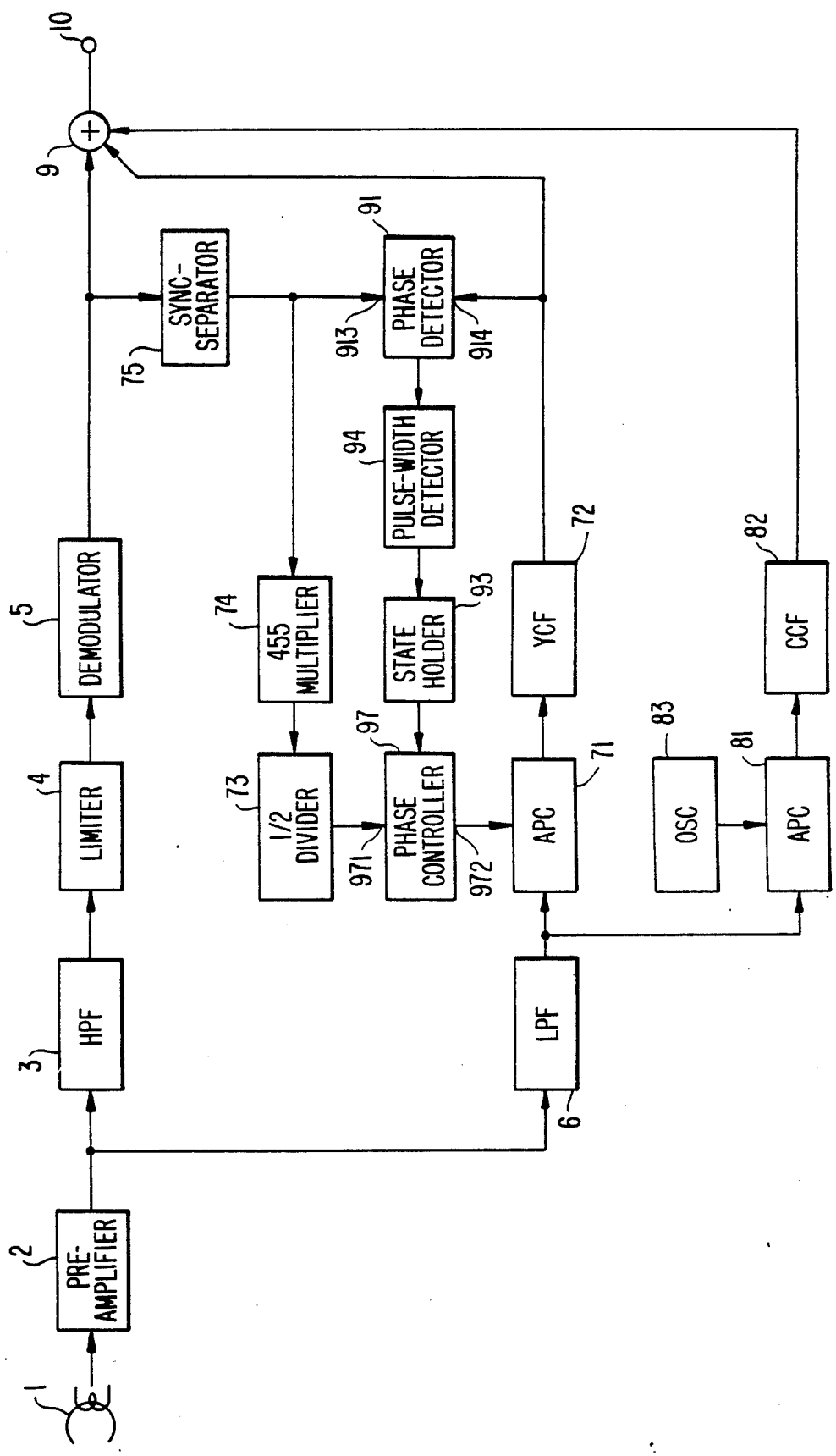

In the NTSC system the color subcarrier frequency $f_s$ is 227.5 $f_H$. When the phase is correctly adjusted, only two kinds of phase relationships exist between the synchronizing signal and its high-band component, i.e., 0° and 180°. Therefore, if the phase is apart from each other by 180°, the phase may be simply inverted to 0° by the phase shifter 92 incorporating a simple circuit for switching either an inversion or a non-inversion, and yet, a flip-flop may be employed for the phase detector 91. Such modification is shown in FIG. 6 in which the phase shifter 92 is replaced by a pulse-width detector 94, a state holder 93, and a phase controller 97.

The pulse-width detector 94 detects a pulse width of the output pulse of the phase-detector 91 more than a predetermined width for rejecting noises. The state holder 93 inverts its state when there is a pulse output from the pulse-width detector 94, and holds its present state when there is no pulse output from the detector 94. The phase controller 97 causes the phase of the frequency-conversion carrier-frequency either invert or return to the original state in response to the output of the state holder 93. If the phase relationship between the synchronizing signal of the demodulated low-band luminance signal and the high-band component of the synchronizing signal in the high-band luminance signal $Y_H$ is opposite to each other, the phase of the carrier for frequency conversion is inverted to allow the high-band luminance signal to be eventually inverted, so that the phases of the low-and-high-bands of the luminance signal can correctly match each other.

Figure 7:
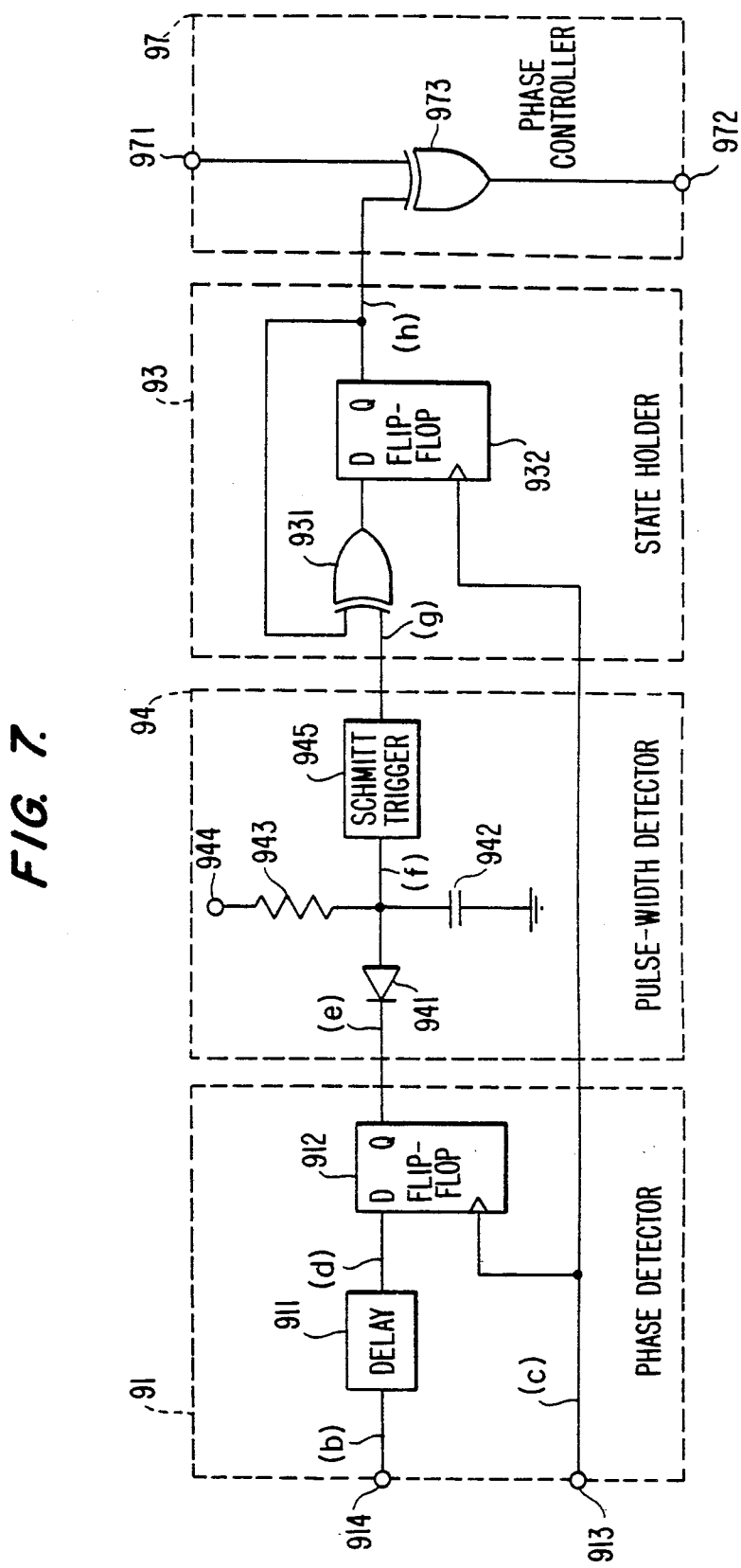
FIG. 7 is a circuit diagram showing a part of the video signal reproduction apparatus shown in FIG. 6.
Figure 8:
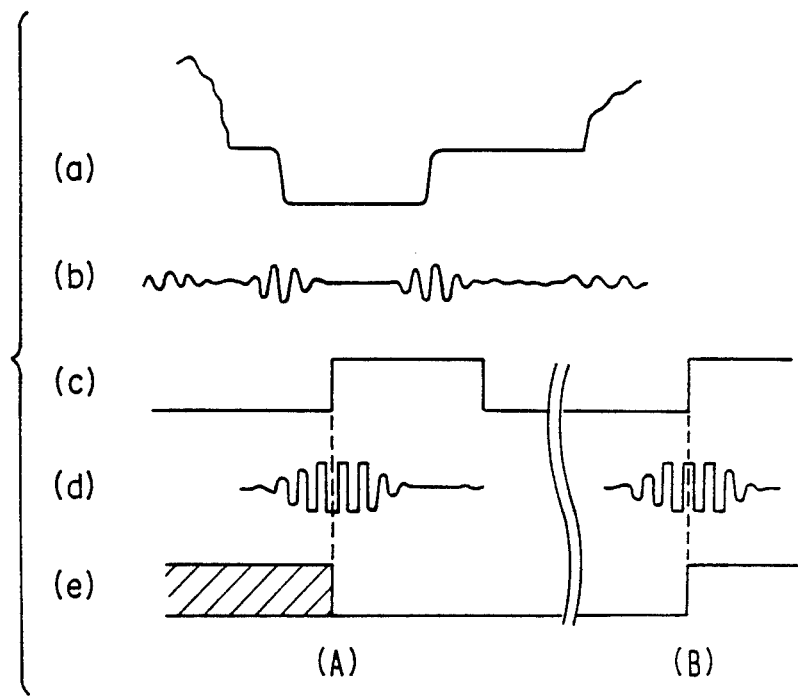
Figure 9:
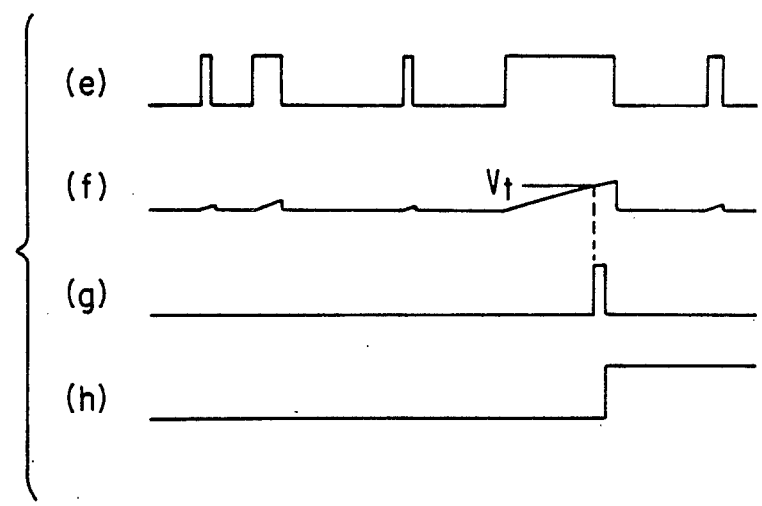

Circuit construction implementing these operation is shown in FIG. 7. FIGS. 8 and 9 respectively show waveforms at the respective points in the circuit of FIG. 7. Note that input terminals 913 and 914 of the phase detector 91, an input terminal 971 and an output terminal 972 of the phase controller 97 respectively correspond to those shown in FIG. 6.

In FIG. 8, (a) shows a waveform of the output signal of the demodulator 5, and (c) shows a waveform of the output signal of the sync-separator 75, which becomes a trigger input of a flip-flop 912. A waveform (b) in FIG. 8 shows the output signal of the luminance comb filter 72, which is then passed through a delay line 911 to be as shown by (d) so that the timing thereof can correctly match the separated synchronizing signal. The waveform (d) is delivered to the flip-flop 912 as a data input signal. The flip-flop 912 is substantially a phase detector which outputs a signal as shown by (e). When the phase relationship is correct as shown by (A), the output (e) is LOW as shown, whereas the output (e) becomes HIGH when the phase is inverted as shown by (B). Thus, the phase detector 91 can detect the inversed phase.

FIG. 9 shows the phase relationship on an extended time axis. The phase detector 91 outputs the pulse (e) in FIG. 9. A terminal 944 of the pulse-width detector 94 is connected to a power supply source. An integration circuit comprised of a diode 941, a capacitor 942, and a resistor 943 generates a waveform (f) in FIG. 9. When the pulse width of (e) is wide, i.e., when the phase is inverted for a long period of time, the output voltage (f) of the integration circuit exceeds a threshold voltage Vt of a Schmitt trigger circuit 945, so that the output of the Schmitt trigger circuit 945 goes HIGH as shown by (g) in FIG. 9. This causes the status of the state holder 93 comprised of an exclusive (EX)-OR gate 931 and a flip-flop 932 to be inverted as shown by (h) in FIG. 9. The phase controller 97 which is substantially comprised of an EX-OR gate 973 inverts the phase of the carrier for frequency conversion to be the correct phase. Even if the phase detector 91 may mulfunction due to a noise interference, since the output voltage of the integration circuit will not exceed the threshold voltage Vt, the state of the state holder 93 will not be inverted.

In this way, the phase of the carrier for frequency conversion is correctly held so that the phases of the high-band luminance signal $Y_H$ and the low-band luminance signal $Y_L$ can securely match each other.

Inversion of the phase of the carrier for frequency conversion causes the phase of the high-band luminance signal to be inverted. Alternatively, the phase controller 97 may be inserted into a line just before or after the luminance comb filter 72 instead of being inserted into the output terminal of the ½ frequency-divider 73 for directly inverting the phase of the high-band luminance signal.

Figure 10:
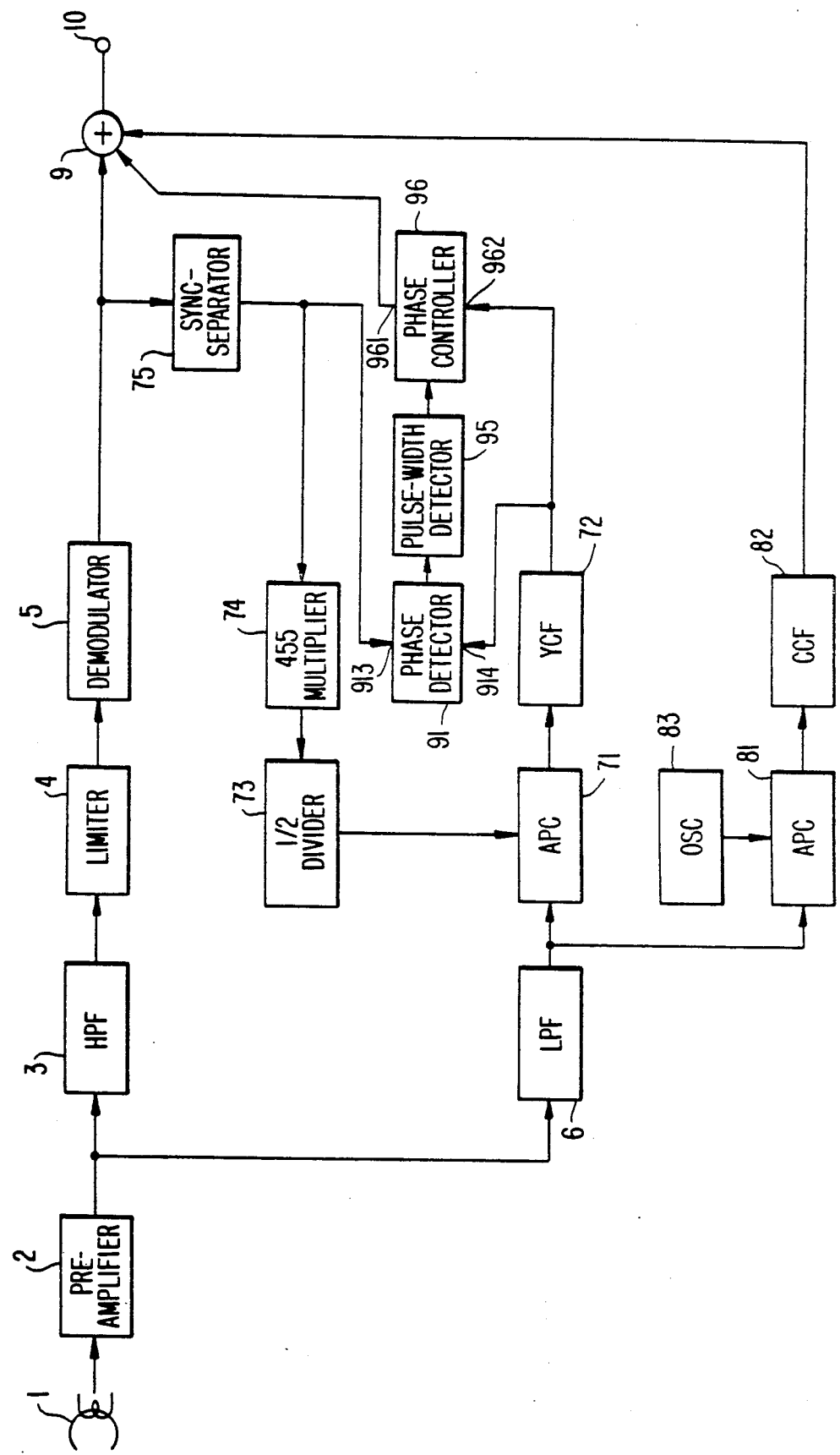
FIG. 10 is a block diagram showing a video signal reproduction apparatus as a still further preferred embodiment of the present invention.

FIG. 10 shows still another preferred embodiment of the present invention, in which the phase shifter 92 shown in FIG. 5 is inserted after the output terminal of the luminance comb filter 72. In this embodiment, a pulse-width detector 95 and a phase controller 96 are employed in place of the phase shifter 92.

To eliminate adverse effect of a noise interference, the pulse-width detector 95 detects an output pulse of the phase detector 91 only when the pulse-width thereof is larger than a predetermined width. The phase controller 96 inverts the phase of the high-band luminance signal $Y_H$ in response to the output signal of the pulse-width detector 95. When the phases of the synchronizing signal of the demodulated low-band luminance signal and the high-band component of the synchronizing signal in the high-band luminance signal $Y_H$ are in the reverse relationship, the phase controller 96 inverts the phase of the high-band luminance signal to correctly match the phases of the low-band and high-band components of the luminance signal.

Figure 11:
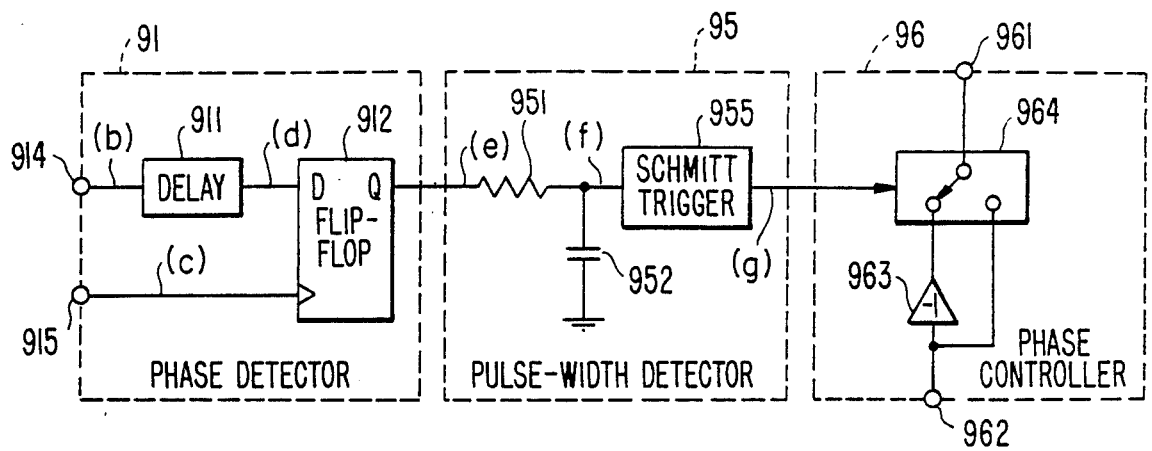
FIG. 11 is a circuit diagram showing a part of the video signal reproduction apparatus shown in FIG. 10.

FIG. 11 shows a circuit executing this operation. Input terminals 913 and 914 of the phase detector 91 and an input terminal 962 and an output terminal 961 of the phase controller 96 shown in FIG. 11 respectively correspond to those shown in FIG. 10.

Figure 12:
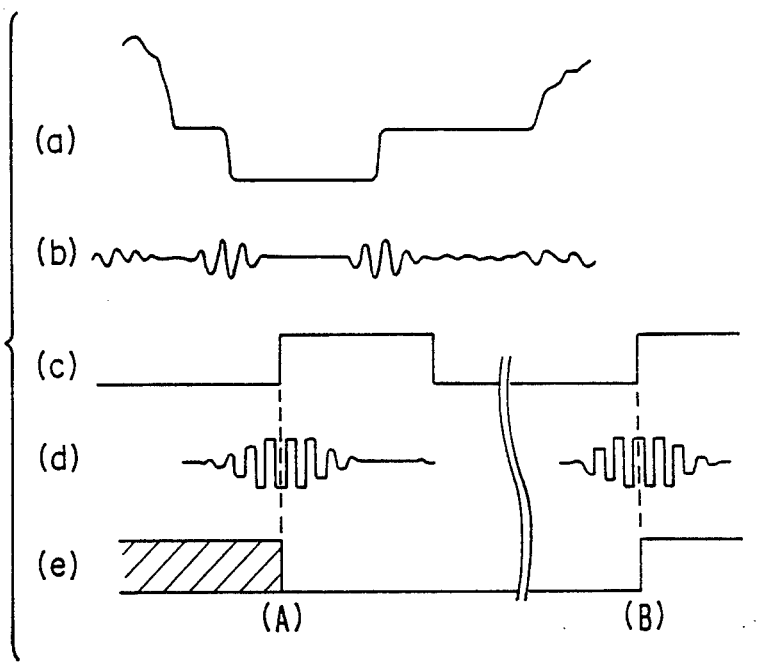
Figure 13:
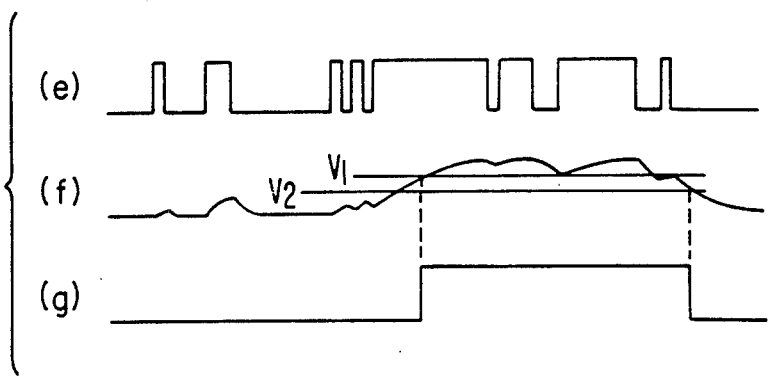

FIGS. 12 and 13 respectively show waveforms at the respective points in the circuit shown in FIG. 11. In FIG. 12, (a) shows a waveform of the output signal of the demodulator 5. This waveform is converted by the sync-separator 75 into a signal shown by (c) which becomes a trigger input pulse of a flip-flop 912. A waveform (b) in FIG. 12 is the output signal of the luminance comb filter 72. The signal (b) is passed through a delay-line 911 in FIG. 11 to be as shown by (d) in FIG. 12 for correctly matching its timing with the synchronizing signal, and then fed to the flip-flop 912 as a data input signal. These operations are identical to those which are shown in FIG. 6. The flip-flop 912 is substantially a phase detector. When the phase is normal as shown by (A) in FIG. 12, the output of the flip-flop 912 becomes LOW as shown by (e) in FIG. 12. Conversely, when the phase inverses as shown by (B) in FIG. 12, the output of the flip-flop 912 becomes HIGH as shown by (e) in FIG. 12.

In FIG. 13 (e) shows the output signal of the phase detector 91 on an extended time axis. The output signal of an integration circuit comprised of a resistor 951 and a capacitor 952 in FIG. 11 becomes as shown by (f) in FIG. 13. If a pulse of the signal (e) has an extensive width, the output voltage of the integration circuit exceeds threshold voltages $V_1$ and $V_2$ of a Schmitt-trigger circuit 955 which thus outputs a signal as shown by (g) in FIG. 13. The phase of the high-band luminance signal is thus either inverted or brought back to the normal state by means of the phase controller 96 comprised of an inverting amplifier 963 and a change-over switch 964 responsive to the output signal (g) of the pulse-width detector 95. Even when the phase detector 91 malfunctions by a noise interference, the output voltage of the integration circuit will not exceed the threshold voltages $V_1$ and $V_2$.

Thus, the phase of the high-band luminance signal $Y_H$, when in the reversed phase, is inversed to be the normal phase to allow the high-band luminance signal $Y_H$ and the low-band luminance signal $Y_L$ correctly match each other.

The circuits in FIGS. 7 and 11 may be modified in various manners to achieve the same functions. Also, the above described embodiments may be changed and modified within the scope of the invention.

What is claimed is:

1. A video signal reproduction apparatus comprising:
means for reproducing from a recording medium a recorded video signal containing a low-band-converted signal and a frequency-modulated signal, said low-band-converted signal being a color subcarrier-band signal separated from a composite color video signal and converted into a low-frequency band, said frequency-modulated signal being a carrier signal frequency-modulated by a luminance signal separated from the composite color video signal;
means for separating the reproduced video signal into said low-band-converted signal and said frequency-modulated signal;
means for demodulating said frequency-modulated signal to obtain a reproduced luminance signal;
first frequency conversion means for frequency-converting said low-band-converted signal by a local oscillation signal to obtain a first color subcarrier-band signal without a phase jitter component;
second frequency conversion means for frequency-converting said low-band-converted signal by a variable oscillation signal which is synchronized with said reproduced luminance signal to obtain a second color subcarrier-band signal with a same phase jitter component as that of said reproduced luminance signal; and
means for mixing said reproduced luminance signal and said first and second color subcarrier-band signals to obtain a reproduced composite color video signal.

2. A video signal reproduction apparatus comprising:
means for reproducing from a recording medium a recorded video signal containing a low-band-converted signal and a frequency-modulated signal, said low-band-converted signal being a color subcarrier-band signal separated from a composite color video signal and converted into a low-frequency band, said frequency-modulated signal being a carrier signal frequency-modulated by a luminance signal separated from the composite color video signal;
means for separating the reproduced video signal into said low-band-converted signal and said frequency-modulated signal;
means for demodulating said frequency-modulated signal to obtain a reproduced luminance signal;
means for separating a horizontal synchronizing signal from said reproduced luminance signal;
first frequency conversion means for frequency-converting said low-band-converted signal by a local oscillation signal to obtain a first color subcarrier-band signal without a phase jitter component;
second frequency conversion means for frequency-converting said low-band-converted signal by a variable oscillation signal which is synchronized with said horizontal synchronizing signal to obtain a second color subcarrier-band signal, and extracting from said second color subcarrier-band signal a high-band luminance signal with a same phase jitter component as that of said reproduced luminance signal; and
means for mixing said reproduced luminance signal, said high-band luminance signal and said first color subcarrier-band signal to obtain a reproduced composite color video signal.

3. The apparatus according to claim 2, wherein said second frequency conversion means includes means for controlling the phase of said variable oscillation signal so that a phase difference between the phases of said horizontal synchronizing signal separated from said reproduced luminance signal and a high-band component of a horizontal synchronizing signal contained in said second color subcarrier-band signal becomes constant.

4. A video signal reproduction apparatus comprising:
means for reproducing from a recording medium a recorded video signal containing a low-band-converted signal and a frequency-modulated signal, said low-band-converted signal being a color subcarrier-band signal separated from a composite color video signal and converted into a low-frequency band, said frequency-modulated signal being a carrier signal frequency-modulated by a luminance signal separated from the composite color video signal;
means for separating the reproduced video signal into said low-band-converted signal and said frequency-modulated signal;
means for demodulating said frequency-modulated signal to obtain a reproduced luminance signal;
first frequency conversion means for frequency-converting said low-band-converted signal by a local oscillation signal to obtain a first color subcarrier-band signal without a phase jitter component, and extracting from said first color subcarrier-band signal a reproduced chorominance signal;
second frequency conversion means for freqency-converting said low-band-converted signal by a variable oscillation signal to obtain a second color subcarrier-band signal with a same phase jitter component as that of said reproduced chrominance signal, and extracting from said second color subcarrier-band signal a high-band component of luminance signal with said same jitter component as that of said reproduced luminance signal; and
means for mixing said reproduced luminance signal, said high-band component of luminance signal and said chrominance signal to obtain a reproduced composite color video signal,
wherein said second frequency conversion means comprises:
means for separating a horizontal synchronizing signal from said reproduced luminance signal;
means for generating said variable oscillation signal from said horizontal synchronizing signal;
automatic phase controller for frequency-converting said low-band-converted signal by said variable oscillation signal to said second color subcarrier-band signal; and
filter means for extracting said high-band component of luminance signal from said second color subcarrier-band signal.

5. The apparatus according to claim 4, wherein said filter means comprises a comb filter for attenuating a chrominance signal contained in said second color subcarrier-band signal.

6. The apparatus according to claim 4, wherein said second frequency conversion means further comprising a pulse generator for generating a pulse signal synchronized with said horizontal synchronizing signal, wherein said filter means comprises a comb filter for attenuating a chrominance signal contained in said second color subcarrier-band signal, said comb filter having a variable delay element which varies its delay time in response to said pulse signal.

7. The apparatus according to claim 4, wherein said filter means comprises a comb filter for attenuating a chrominance signal contained in said second color subcarrier-band signal, said comb filter having a variable delay element which varies its delay time in response to a pulse signal generated by an oscillator in said variable oscillation signal generating means.

8. A video signal reproduction apparatus comprising:
means for reproducing from a recording medium a recorded video signal containing a low-band-converted signal and a frequency-modulated signal, said low-band-converted signal being a color subcarrier-band signal separated from a composite color video signal and converted into a low-frequency band, said frequency-modulated signal being a carrier signal frequency-modulated by a luminance signal separated from the composite color video signal;
means for separating the reproduced video signal into said low-band-converted signal and said frequency-modulated signal;
means for demodulating said frequency-modulated signal to obtain a reproduced luminance signal;
first frequency conversion means for frequency-converting said low-band-converted signal by a local oscillation signal to obtain a first color subcarrier-band signal without a phase jitter component, and extracting from said first color subcarrier-band signal a reproduced chrominance signal;
second frequency conversion means for frequency-converting said low-band-converted signal by a variable oscillation signal to obtain a second color subcarrier-band signal with a same phase jitter component as that of said reproduced chrominance signal, and extracting from said second color subcarrier-band signal a high-band component of luminance signal with said same jitter component as that of said reproduced luminance signal; and
means for mixing said reproduced luminance signal, said high-band component of luminance signal and said chrominance signal to obtain a reproduced composite color video signal,
wherein said second frequency conversion means comprises:
means for separating a horizontal synchronizing signal from said reproduced luminance signal;
means for generating said variable oscillation signal from said horizontal synchronizing signal;
automatic phase controller for frequency-converting said low-band-converted signal by said variable oscillation signal to said second color subcarrier-band signal;
filter means for extracting said high-band component of luminance signal from said second color subcarrier-band signal; and
phase control means for controlling the phase of said variable oscillation signal so that a phase difference between the phases of said horizontal synchronizing signal separated from said reproduced luminance signal and a high-band component of horizontal synchronizing signal contained in said high-band component of luminance signal is eliminated.

9. The apparatus according to claim 8, wherein said phase control means comprises a phase detector for detecting said phase difference and producing a phase difference pulse signal, and a phase shifter responsive to said phase difference pulse signal for shifting the phase of said variable oscillation signal.

10. The apparatus according to claim 9, wherein said phase shifter comprises a pulse-width detector for detecting said phase difference pulse signal only when the pulse-width of said phase difference pulse signal is larger than a predetermined width, a state holder which inverts its state only when said pulse-width detector detects said phase difference pulse signal, and a phase controller responsive to an output signal of said state holder for inverting the phase of said variable oscillation signal.

11. The apparatus according to claim 8, wherein said filter means comprises a comb filter for attenuating a chrominance signal contained in said second color subcarrier-band signal.

12. The apparatus according to claim 8, wherein said variable oscillation signal generating means comprises a frequency multiplier for multiplying the frequency of said horizontal synchronizing signal separated from said reproduced luminance signal, and a frequency divider for dividing the frequency of an output signal of said frequency multiplier.

13. A video signal reproduction apparatus comprising:
means for reproducing from a recording medium a recorded video signal containing a low-band-converted signal and a frequency-modulated signal, said low-band-converted signal being a color subcarrier-band signal separated from a composite color video signal and converted into a low-frequency band, said frequency-modulated signal being a carrier signal frequency-modulated by a luminance signal separated from the composite color video signal;
means for separating the reproduced video signal into said low-band-converted signal and said frequency-modulated signal;
means for demodulating said frequency-modulated signal to obtain a reproduced luminance signal;
first frequency conversion means for frequency-converting said low-band-converted signal by a local oscillation signal to obtain a first color subcarrier-band signal without a phase jitter component, and extracting from said first color subcarrier-band signal a reproduced chrominance signal;
second frequency conversion means for frequency-converting said low-band-converted signal by a variable oscillation signal to obtain a second color subcarrier-band signal with a same phase jitter component as that of said reproduced chrominance signal, and extracting from said second color subcarrier-band signal a high-band component of luminance signal with said same jitter component as that of said reproduced luminance signal; and
means for mixing said reproduced luminance signal, said high-band component of luminance signal and said chrominance signal to obtain a reproduced composite color video signal,
wherein said second frequency conversion means comprises:
means for separating a horizontal synchronizing signal from said reproduced luminance signal;
means for generating said variable oscillation signal from said horizontal synchronizing signal;
automatic phase controller for frequency-converting said low-band-converted signal by said variable oscillation signal to said second color subcarrier-band signal;

filter means for extracting said high-band component of luminance signal from said second color subcarrier-band signal; and phase control means for controlling the phase of said high-band component of luminance signal so that a phase difference between the phases of said horizontal synchronizing signal separated from said reproduced luminance signal and a high-band component of horizontal synchronizing signal contained in said high-band component of luminance signal is eliminated.

14. The apparatus according to claim 13, wherein said phase control means comprises a phase detector for detecting said phase difference and producing a phase difference pulse signal, a pulse-width detector for detecting said phase difference pulse signal only when the pulse-width of said phase difference pulse signal is larger than a predetermined width, and a phase controller responsive to an output signal of said pulse-width detector for inverting the phase of said high-band component of luminance signal.

15. The apparatus according to claim 14, wherein said filter means comprises a comb filter for attenuating a chrominance signal contained in said second color subcarrier-band signal.

16. The apparatus according to claim 14, wherein said variable oscillation signal generating means comprises a frequency multiplier for multiplying the frequency of said horizontal synchronizing signal separated from said reproduced luminance signal, and a frequency divider for dividing the frequency of an output signal of said frequency multiplier.

* * * * *